(12) United States Patent
Mathison et al.

(10) Patent No.: US 10,158,524 B2
(45) Date of Patent: Dec. 18, 2018

(54) SYSTEM AND METHOD FOR ENHANCED NETWORK EVENT MONITORING AND REPORTING

(71) Applicant: Verizon Patent and Licensing Inc., Arlington, VA (US)

(72) Inventors: James Mathison, Warren, NJ (US); Ye Huang, San Ramon, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/429,644

(22) Filed: Feb. 10, 2017

(65) Prior Publication Data

US 2018/0234291 A1    Aug. 16, 2018

(51) Int. Cl.
| | |
|---|---|
| *H04W 24/00* | (2009.01) |
| *H04L 12/24* | (2006.01) |
| *H04L 12/26* | (2006.01) |
| *H04W 4/14* | (2009.01) |
| *H04W 60/00* | (2009.01) |

(52) U.S. Cl.
CPC ...... *H04L 41/0686* (2013.01); *H04L 41/0631* (2013.01); *H04L 43/065* (2013.01); *H04L 43/0811* (2013.01); *H04W 4/14* (2013.01); *H04W 60/00* (2013.01)

(58) Field of Classification Search
CPC ... H04W 24/10; H04W 76/027; H04W 88/02; H04W 24/08
See application file for complete search history.

(56) References Cited

U.S. PATENT DOCUMENTS

| | | | | |
|---|---|---|---|---|
| 6,614,350 | B1* | 9/2003 | Lunsford | G08B 13/1418 340/539.11 |
| 9,629,021 | B2* | 4/2017 | Jeong | H04W 76/18 |
| 9,936,428 | B2* | 4/2018 | Faccin | H04W 36/0055 |
| 2009/0265643 | A1* | 10/2009 | Jachner | H04L 51/04 715/758 |
| 2010/0329205 | A1* | 12/2010 | Bi | H04W 48/04 370/331 |
| 2015/0036492 | A1* | 2/2015 | Jin | H04W 76/027 370/230 |
| 2015/0103664 | A1* | 4/2015 | Shan | H04W 24/10 370/235 |
| 2016/0309379 | A1* | 10/2016 | Pelletier | H04W 76/27 |
| 2017/0181214 | A1* | 6/2017 | Kim | H04W 60/04 |

* cited by examiner

*Primary Examiner* — Dung Hong (57) ABSTRACT

A device may detect an event associated with a user device. The event may include at least one of a data reachability event, a loss of connectivity event, or a loss of reachability event. The device may determine, based on detecting the event, event information associated with the event. The event information may include information that identifies a type of a packet data network (PDN) connection when the event includes a data reachability event. The event information may include information that identifies a reason for detachment from a network when the event includes a loss of connectivity event. The event information may include information indicating that one or more PDN connections have been closed when the event includes a loss of reachability event. The device may provide the event information for reporting to one or more devices that are to receive event reports associated with the user device.

20 Claims, 7 Drawing Sheets

SYSTEM AND METHOD FOR ENHANCED NETWORK EVENT MONITORING AND REPORTING

BACKGROUND

Event monitoring capabilities allow a network to report occurrences of certain kinds of events, such as device reachability for data and short message service (SMS) communication, as well as loss of connectivity. Event reports are delivered to a network element such as a service capability exposure function server, which can expose or transfer this information to other device, such as an application server.

DETAILED DESCRIPTION OF PREFERRED EMBODIMENTS

The following detailed description of example implementations refers to the accompanying drawings. The same reference numbers in different drawings may identify the same or similar elements.

A prior event monitoring capability may allow a network to report an event associated with a user device (herein referred to as a user device event), such as a reachability event for data communication, a reachability event for short message service (SMS) communication, a loss of connectivity event, or the like.

A reachability event for data communication (herein referred to as a data reachability event) is reported when, for example, a user device establishes a packet data network (PDN) connection associated with the network, when the user device performs a periodic tracking area update (TAU) (e.g., in order to report user device liveness and/or location), or the like. A purpose of reporting the data reachability event is to inform another device (e.g., an application server) that the user device is available to receive data communication (e.g., via an Internet protocol (IP) PDN or a non-IP PDN).

A reachability event for SMS communication (herein referred to as a SMS reachability event) is reported when, for example, the user device attaches to the network, when the user device performs a TAU, or the like. A purpose of reporting the SMS reachability event is to inform the other device that the user device is available to receive data and/or control information via an SMS service.

A loss of connectivity event is reported when, for example, the user device does not perform an expected TAU, which causes the user device to be detached from the network (e.g., by another network device, such as a mobility management entity (MME)). A purpose of reporting the loss of connectivity event is to inform the other device that the user device has unexpectedly and/or abnormally detached from the network and is no longer available.

However, while such event reporting capabilities may be effective at informing the other device regarding whether the user device is available for data and/or SMS communication, such event reporting capabilities do not allow the other device to be informed as to how the other device may communicate with the user device.

For example, in a case where the other device has subscribed to receive event reports associated with a particular user device, when the particular user device establishes a PDN connection, a data reachability event report, indicating that the particular user device is available, may be provided to the other device (e.g., via a service capability exposure function device (SCEF)). However, the information provided to the other device does not include information indicating a type of PDN connection that the particular user device has established (e.g., an IP PDN or a non-IP PDN). Thus, the other device has no information indicating which communication method to use to communicate with the particular user device. Additionally, the information provided to the other device does not provide any information that identifies the PDN connection that has been established. Thus, if the particular user device supports establishment of multiple PDN connections (e.g., for supporting different applications), the other device does not have any indication whether the established PDN connection is associated with the other device (e.g., whether the established PDN connection is associated with an application hosted by the other device). Here, the application server must have an additional source of information associated with the PDN options and/or capabilities of the particular user device.

Another issue that arises with event reporting capabilities is that, while establishment of a PDN connection may be reported, a PDN disconnection is not reported. For example, as described above, the loss of connectivity event may report that the user device has abnormally detached from the network. However, the user device could remain attached to the network (e.g., such that no loss of connectivity is reported), but disconnect from a PDN that may be used by the other device for communicating with the user device. For example, assume that an application server subscribes to receive event reports for a particular user device. Here, when the particular user device attaches to the network and establishes a PDN connection, the application server may be informed that the particular user device is available for communication. However, if at a later time, the particular user device disconnects from the PDN, but stays attached to the network (e.g., with only SMS capability), then the application server is not informed that the PDN connection has been closed and that the particular user device is no longer available for data communication.

An additional issue with these earlier event reporting capabilities is that a loss of connectivity event report occurs only when the user device fails to perform an expected TAU. In that case, a normal detachment from the network by the user device does not trigger reporting of this type of event, nor does any other abnormal detachment other than a failure to perform expected TAU. Thus, even though the other device may be subscribed to receive an event report indicating that the other device can no longer communicate with the user device, the other device may not receive this type of information in some cases.

Implementations described herein solve the shortcomings of the earlier systems and provide a device that is capable of performing enhanced communication and event reporting associated with various types of user device events. In some implementations, the enhanced communications and reporting capability allows one or more other devices, subscribed to receive event reporting information associated with the user device, to obtain more detailed, accurate and/or updated event information (e.g., as compared to event information provided using a prior event reporting capability), thereby allowing the one or more devices to more efficiently and/or effectively utilize resources (e.g., network resources, processing resources, or the like) when communicating with one or more user devices.

Figure 1:
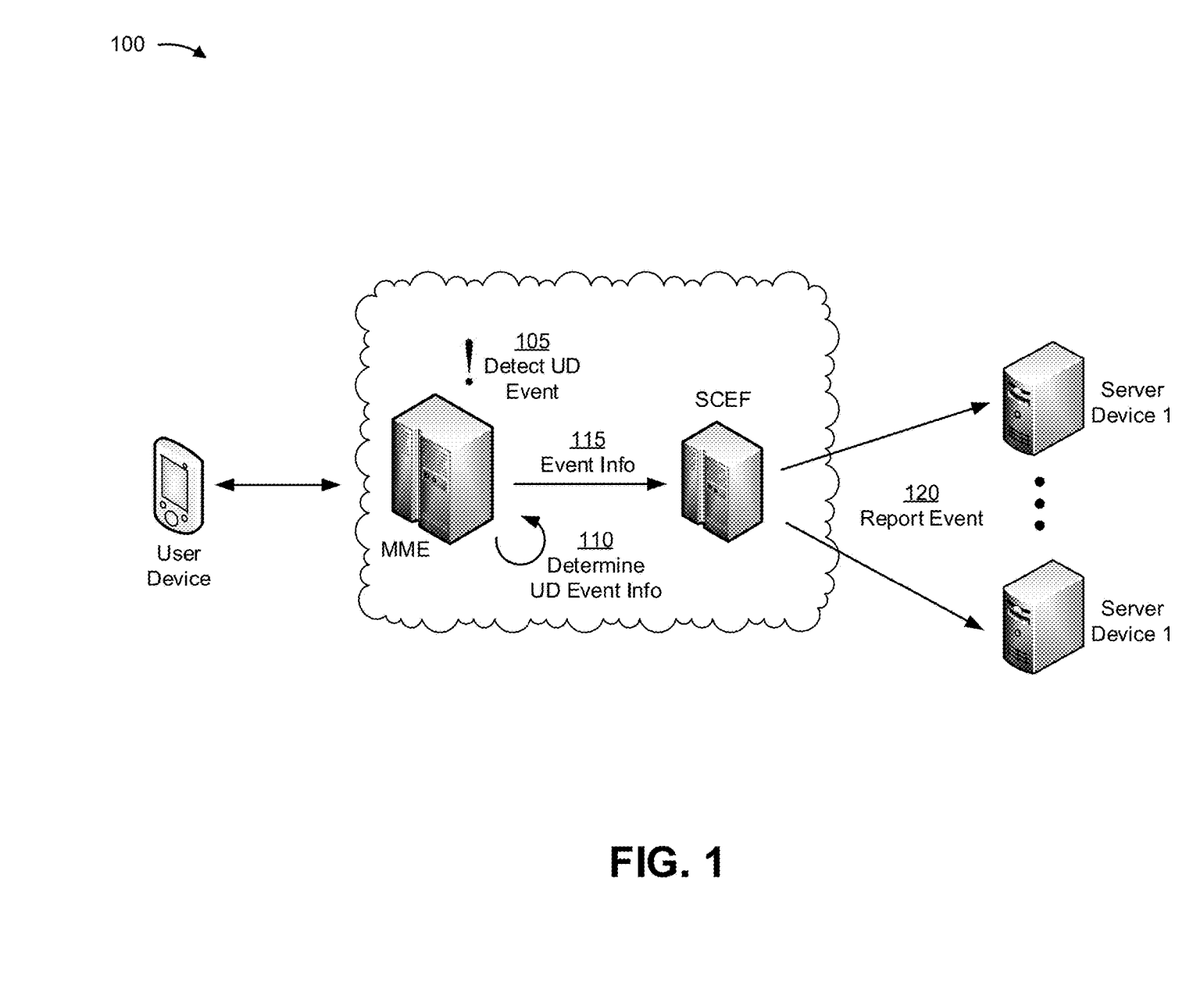
FIG. 1 is a diagram of an overview of an example implementation described herein.

FIG. 1 is a diagram of an overview of an example implementation 100 described herein. As shown by reference number 105, a mobility management entity (MME) detects an event associated with a user device. An event may include, for example, a reachability event, a loss of connectivity event, a loss of reachability event, or the like.

At reference number 110, the MME determines enhanced event information associated with the event. The enhanced event information may include information, associated with the user device event, that may be used by another device (e.g., an application server) to determine whether and how the other device may communicate with the user device. For example, for a data reachability event, the enhanced event information may include information that identifies a type of PDN connection associated with the user device (e.g., an Internet protocol (IP) type PDN connection, a non-IP type PDN connection), an IP address of the user device (if applicable), an access point name associated with the PDN connection, or the like. As another example, for a loss of connectivity event, the enhanced event information may include information that identifies a reason for detachment of the user device from the network. As another example, for a loss of reachability event, the enhanced event information may include information that identifies a PDN connection that was closed, information that identifies a PDN connection that remains open, or the like.

As shown by reference number 115, the MME provides the enhanced event information to a SCEF server. As shown by reference number 120, the SCEF communicates the enhanced event information to one or more server devices.

In this way, a device may perform enhanced event reporting associated with different types of user device events. Devices that receive the enhanced event reports obtain more detailed, accurate, and updated information (relative to prior event reporting capabilities) associated with user device events, thereby enabling improved and/or more efficient usage of network and/or processing resources while communicating with such user devices.

As indicated above, FIG. 1 is provided merely as an example. Other examples are possible and may differ from what was described with regard to FIG. 1.

Figure 2:
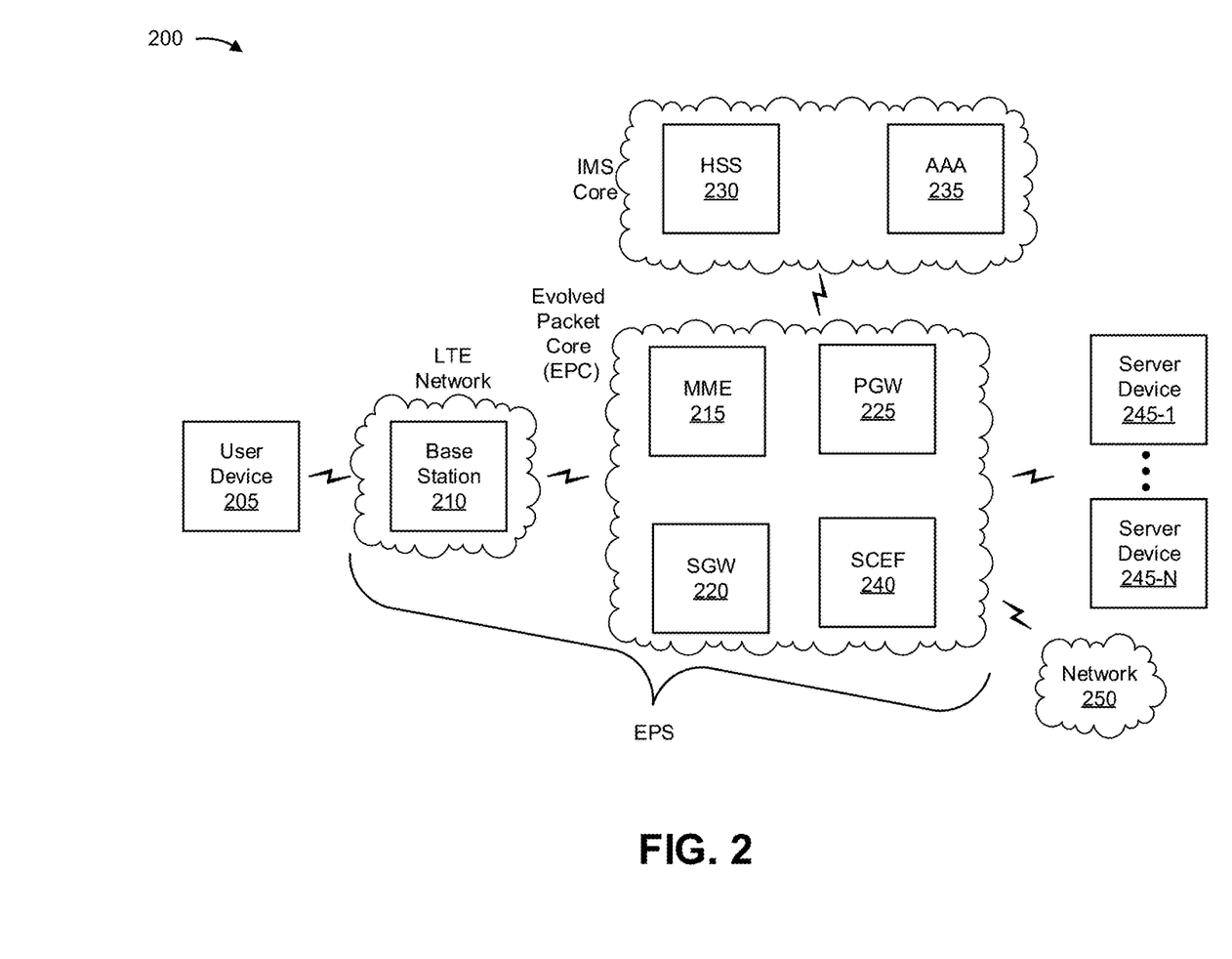
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, mobility management device (MME) 215, a serving gateway (SGW) 220, a PGW 225, a HSS 230, an authentication authorization and accounting server (AAA) 235, a service capability exposure function device (SCEF) 240, one or more server devices 245-1 through 245-N, and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user device 205 communicates with the EPC. The EPC may include MME 215, SGW 220, PGW 225, and/or SCEF 240 that enable user device 205 to communicate with network 250 and/or an Internet protocol (IP) multimedia subsystem (IMS) core. The IMS core may include HSS 230 and/or AAA 235, and may manage device registration and authentication, session initiation, etc., associated with user devices 205. HSS 230 and/or AAA 235 may reside in the EPC and/or the IMS core.

User device 205 may include one or more devices capable of communicating with base station 210 and/or a network (e.g., network 250). For example, user device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, and/or a similar device. User device 205 may send traffic to and/or receive traffic from network 250 (e.g., via base station 210, SGW 220, and/or PGW 225). In some implementations, user device 205 may be capable of establishing a PDN connection (e.g., a non-IP PDN connection and/or a IP PDN connection) with one or more other devices, such as PGW 225.

Base station 210 may include one or more devices capable of transferring traffic, such as audio, video, text, and/or other traffic, destined for and/or received from user device 205. In some implementations, base station 210 may include an eNB associated with the LTE network that receives traffic from and/or sends traffic to network 250 via SGW 220 and/or PGW 225. Additionally, or alternatively, one or more base stations 210 may be associated with a RAN that is not associated with the LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with user device 205. In some implementations, MME 215 may perform operations relating to detecting one or more events associated with user device 205, determining event information associated with the one or more events, and providing the event information for reporting to another device, such as server device 245.

Additionally, or alternatively, MME 215 may perform operations associated with authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME (not pictured), to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 250 (e.g., via PGW 225) and/or other network devices associated with the EPC and/or the IMS core. SGW 220 may also receive traffic from network 250 and/or other network devices, and may send the received traffic to user device 205 via base station 210. Additionally, or alternatively, SGW 220 may perform operations associated with handing off user device 205 to and/or from an LTE network.

PGW 225 may include one or more devices capable of providing connectivity for user device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 250. Additionally, or alternatively, PGW 225 may receive traffic from network 250, and may send the traffic to user device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with user device 205. For example, HSS 230 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with user device 205. For example, AAA 235 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations.

SCEF 240 may include one or more devices, such as one or more server devices, capable of generating, exposing, and/or providing an event report and/or event information, associated with user device 205, to one or more other devices, such as one or more server devices 245. In other words, SCEF 240 includes one or more devices for that allow one or more server devices 245 to access event information associated with user device 205. In some implementations, SCEF 240 receive the event information from another device, such as MME 215.

Server device 245 may include one or more devices, such as one or more servers, capable of receiving an event report, including event information associated with user device 205. In some implementations, server device 245 may be subscribed to receive event information, associated with one or more user devices 205, via SCEF 240. In some implementations, server device 245 may determine whether server device 245 is capable of communicating with a particular user device 205 and/or a manner in which to communicate with a user device 205 based on event information associated with the particular user device 205.

Network 250 may include one or more wired and/or wireless networks. For example, network 250 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
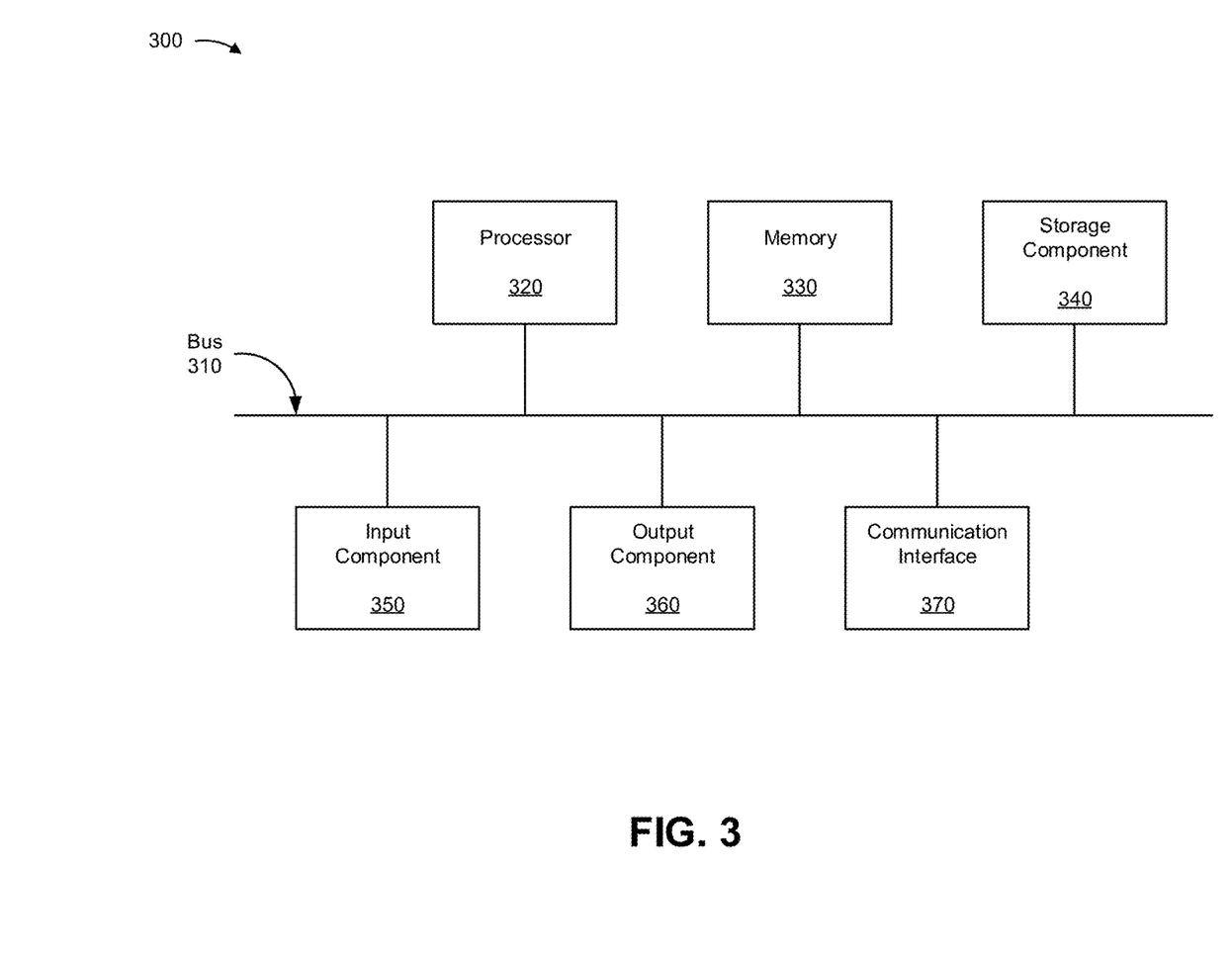
FIG. 3 is a diagram of example components of one or more devices of FIG. 2.

FIG. 3 is a diagram of example components of a device 300. Device 300 may correspond to user device 205, base station 210, MME 215, SGW 220, PGW 225, HSS 230, AAA 235, SCEF 240, and/or server device 245. In some implementations, user device 205, base station 210, MME 215, SGW 220, PGW 225, HSS 230, AAA 235, SCEF 240, and/or server device 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor, a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)). Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
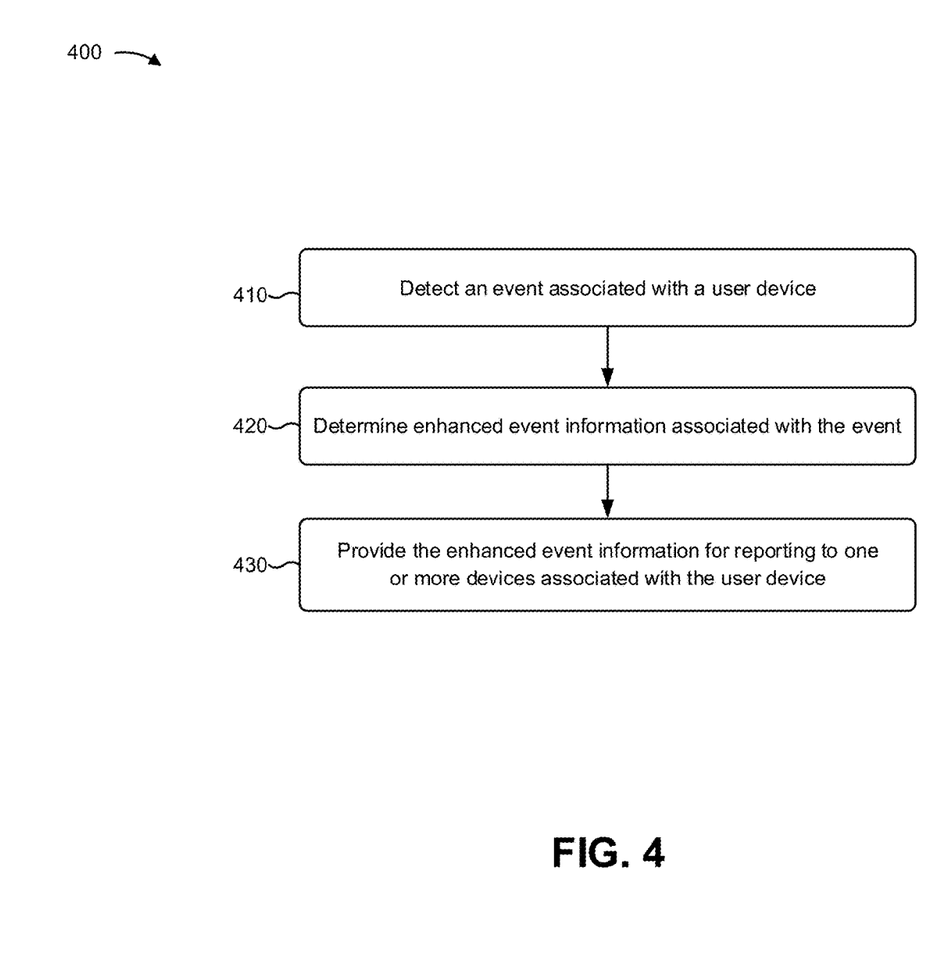
FIG. 4 is a flow chart of an example process for enhanced network event reporting.

FIG. 4 is a flow chart of an example process 400 for enhanced network event reporting. In some implementations, one or more process blocks of FIG. 4 may be performed by MME 215. In some implementations, one or more process blocks of FIG. 4 may be performed by another device or a group of devices separate from or including MME 215, such as user device 205, base station 210, SGW 220, PGW 225, HSS 230, AAA 235, SCEF 240, and/or server device 245.

As shown in FIG. 4, process 400 may include detecting an event associated with a user device (block 410). For example, MME 215 may detect an event associated with user device 205.

A user device event may include an event, associated with user device 205, that is to be reported to another device (e.g., server device 245) for use in determining whether and/or how the other device may communicate with user device 205. For example, the event may include a data reachability event associated with user device 205 (e.g., when user device 205 establishes a PDN connection with PGW 225). In some implementations, the PDN connection may be an IP PDN connection or a non-IP PDN connection. As another example, the event may include a loss of connectivity event associated with user device 205 (e.g., when user device 205 detaches from the network). As another example, the event may include a loss of reachability event associated with a user device 205 (e.g., when a particular PDN connection, associated with user device 205, is torn down or closed such that another device may not communicate with the user device 205 via the particular PDN connection).

In some implementations, MME 215 may detect the event based on information provided by user device 205 (e.g., information provided by user device 205 during establishment of a PDN connection, during closing of a PDN connection, during a process associated with voluntarily detaching from the network). Additionally, or alternatively, MME 215 may detect the event based on a configuration of MME 215 (e.g., when MME 215 does not receive a scheduled transmission from user device 205, such as a TAU). Additionally, or alternatively, MME 215 may detect the event based on information provided by another device, such as base station 210.

As further shown in FIG. 4, process 400 may include determining enhanced event information associated with the event (block 420). For example, MME 215 may determine enhanced event information associated with the user device 205 event.

The enhanced event information may include information that describes the user device event that allows server device 245 to determine whether and how server device 245 can communicate with user device 205. For example, for a data reachability event, the enhanced event information may include information that identifies a type of PDN connection established by the user device (e.g., information that identifies whether the PDN connection is an IP PDN connection or a non-IP PDN connection), information that identifies an access point name (APN) associated with the PDN connection, information that identifies a network address associated with user device 205 (e.g., an IP address of user device 205 when the PDN connection is an IP PDN connection), or the like. In some implementations, the enhanced event information may include information associated with multiple PDN connections.

As another example, for a loss of connectivity event, the enhanced event information may include information that indicates a reason that user device 205 has detached from the network, such as a cause code that may be mapped to a corresponding reason for detachment. Examples of possible reasons for detachment of user device 205 from the network may include a TAU failure, an expiration of an idle time, a normal (i.e., expected, requested, scheduled, or the like) detachment from the network, or the like.

As another example, for a loss of reachability event, the enhanced event information may include information that identifies a PDN connection, associated with user device 205, that was torn down and/or closed. In some implementations, such enhanced event information can be reported in a loss of reachability report that allows server device 245 to determine which, if any PDN connections, are still open. In other words, the loss of reachability event may be reported in a loss of reachability report that includes information that allows server device 245 to modify a previously sent data reachability report in order to determine which, if any, PDN connections, associated with user device 205, remain open. Additionally, or alternatively, the enhanced event information, associated with the loss of reachability event, may be reported via an updated data reachability report (e.g., updated from a previously provided data reachability report) that identifies one or more PDN connections, associated with user device 205, that remain open. In other words, in some implementations, an updated data reachability report may be sent based on MME 215 detecting a loss of reachability event.

As further shown in FIG. 4, process 400 may include providing the enhanced event information for reporting to one or more server devices associated with the user device (block 430). For example, MME 215 may provide the enhanced event information for reporting to one or more server devices 245 associated with user device 205.

In some implementations, MME 215 can provide the enhanced event information to SCEF 240 for reporting to one or more server devices 245. For example, the one or more server devices 245 may be subscribed (e.g., with SCEF 240) to receive event reports associated with user device 205. Here, upon detecting the event associated with user device 205, MME 215 may provide the enhanced event information to SCEF 240. In this example, SCEF 240 may receive the enhanced event information, as well as information that identifies user device 205, may identify (e.g., based on information accessible to SCEF 240) the one or more server devices 245 subscribed to receive event reports associated with user device 205, and may provide the enhanced event information (e.g., in the form of a data reachability report, a loss of connectivity report, and/or a loss of reachability report) to the one or more server devices 245. Additionally, or alternatively, MME 215 can provide the enhanced event information to server devices 245 (e.g., when MME 215 has access to information that identifies the one or more server devices 245 subscribed to receive event reports associated with user device 205).

In some implementations, the enhanced event information allows server device 245 to more effectively and/or efficiently communicate with user device 205. For example, a data reachability report including enhanced event information that identifies a type of PDN connection established by user device 205 (e.g., an IP PDN connection or a non-IP PDN connection), an APN, and/or an IP address, allows server device 245 to identify a particular manner and/or address via which to communicate with user device 205. As another example, a loss of connectivity report, provided based on detecting a loss of connectivity other than a detachment based on a TAU failure, allows server device 245 to be notified when user device 205 has detached form the network for a variety of reasons, thereby preventing server device 245 from attempting to communicate with user device 205 after user device 205 has detached from the network. As another example, a loss of reachability report identifying a PDN connection that has been closed and/or a PDN connection that remains open (even when user device 205 is still attached to the network) allows server device 245 to determine whether user device 205 remains reachable by server device 245, which may conserve resource usage (e.g., since server device 245 may be informed whether user device 205 is reachable on a per-PDN connection basis).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
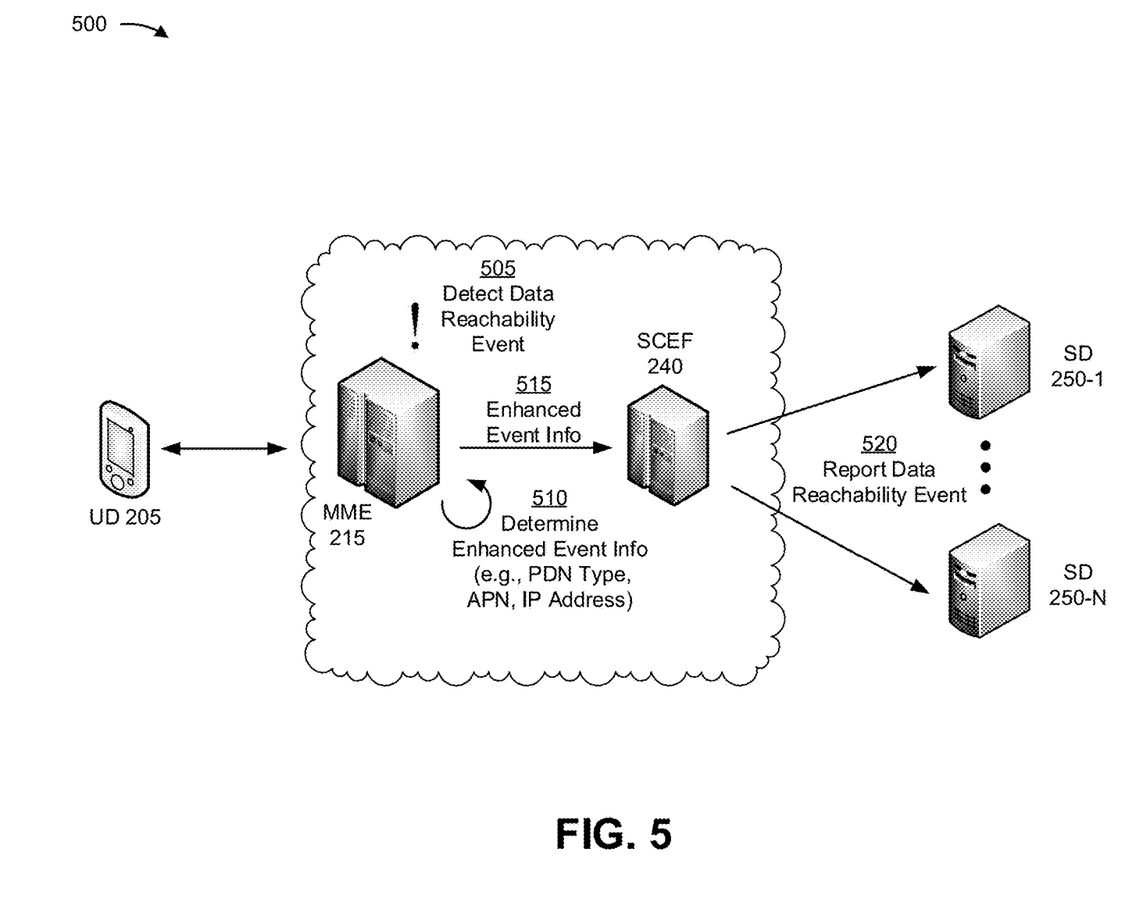
FIG. 5 is a diagram of an example implementation relating to the example process shown in FIG. 4.

FIG. 5 is a diagram of an example implementation 500 relating to example process 400 shown in FIG. 4. FIG. 5 shows an example of enhanced network event reporting.

As shown in FIG. 5, and by reference number 505, MME 215 detects a data reachability event (e.g., establishment of a PDN connection) associated with user device 205. At reference number 510, MME 215 determines enhanced event information associated with the event, such as information that identifies a type of the PDN connection (e.g., IP or non-IP), an IP address (if applicable), an APN, or the like. As shown by reference number 515, MME 215 provides the enhanced event information, associated with the data reachability event, to SCEF 240. As shown by reference number 520, SCEF 240 provides the enhanced event information (e.g., in the form of a data reachability event report) to one or more server devices 245 subscribed to receive event reports associated with user device 205.

As indicated above, FIG. 5 is provided merely as an example. Other examples are possible and may differ from what was described with regard to FIG. 5.

Figure 6:
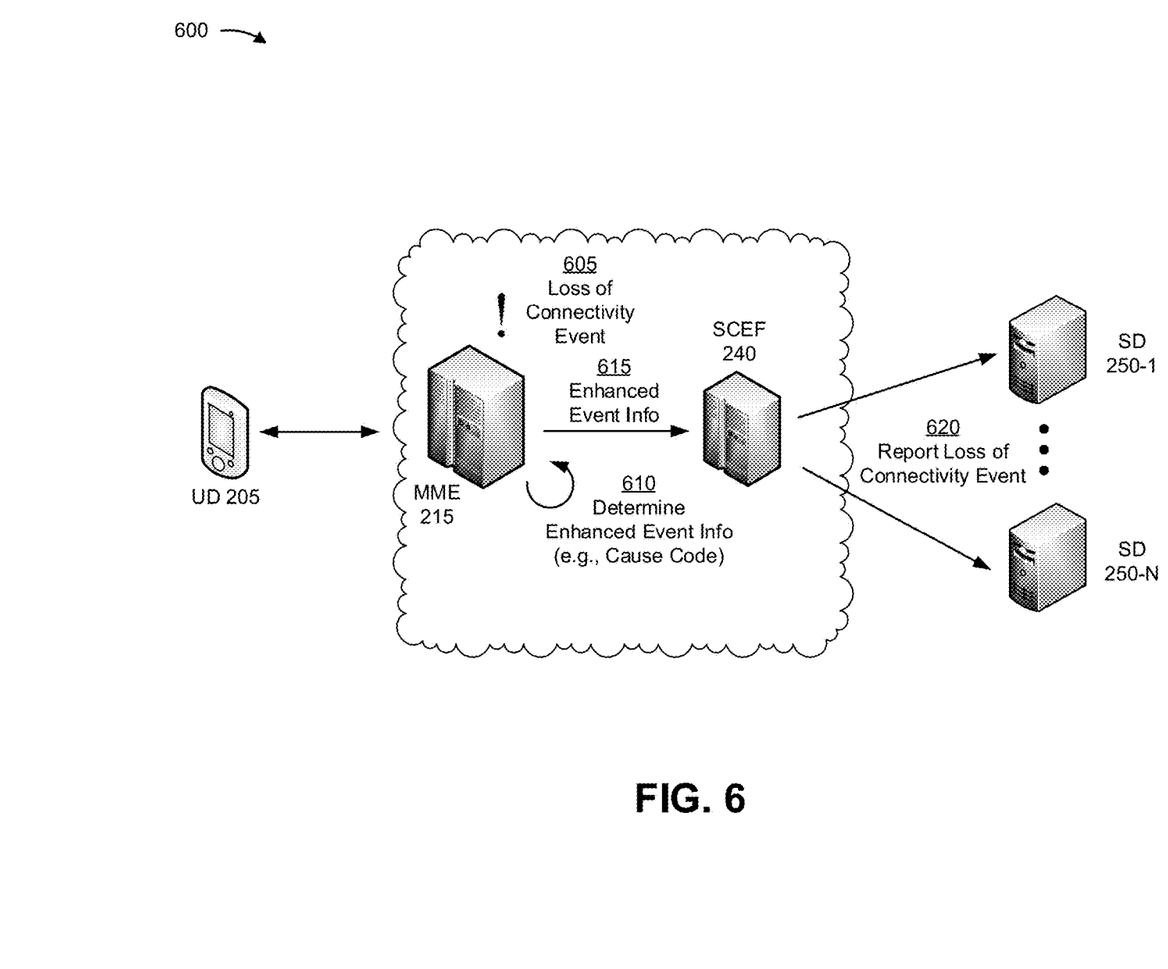
FIG. 6 is a diagram of another example implementation relating to the example process shown in FIG. 4.

FIG. 6 is a diagram of another example implementation 600 relating to example process 400 shown in FIG. 4. FIG. 6 shows another example of enhanced network event reporting.

As shown in FIG. 6, and by reference number 605, MME 215 detects a loss of connectivity event associated with user device 205 (e.g., detachment of user device 205 from the network). As shown by reference number 610, MME 215 determines enhanced event information associated with the event, such as a reason for the detachment of user device 205 from the network. As shown by reference number 615, MME 215 provides the enhanced event information, associated with the loss of connectivity event, to SCEF 240. As shown by reference number 620, SCEF 240 provides the enhanced event information (e.g., in the form of a loss of connectivity event report) to one or more server devices 245 subscribed to receive event reports associated with user device 205.

As indicated above, FIG. 6 is provided merely as an example. Other examples are possible and may differ from what was described with regard to FIG. 6.

Figure 7:
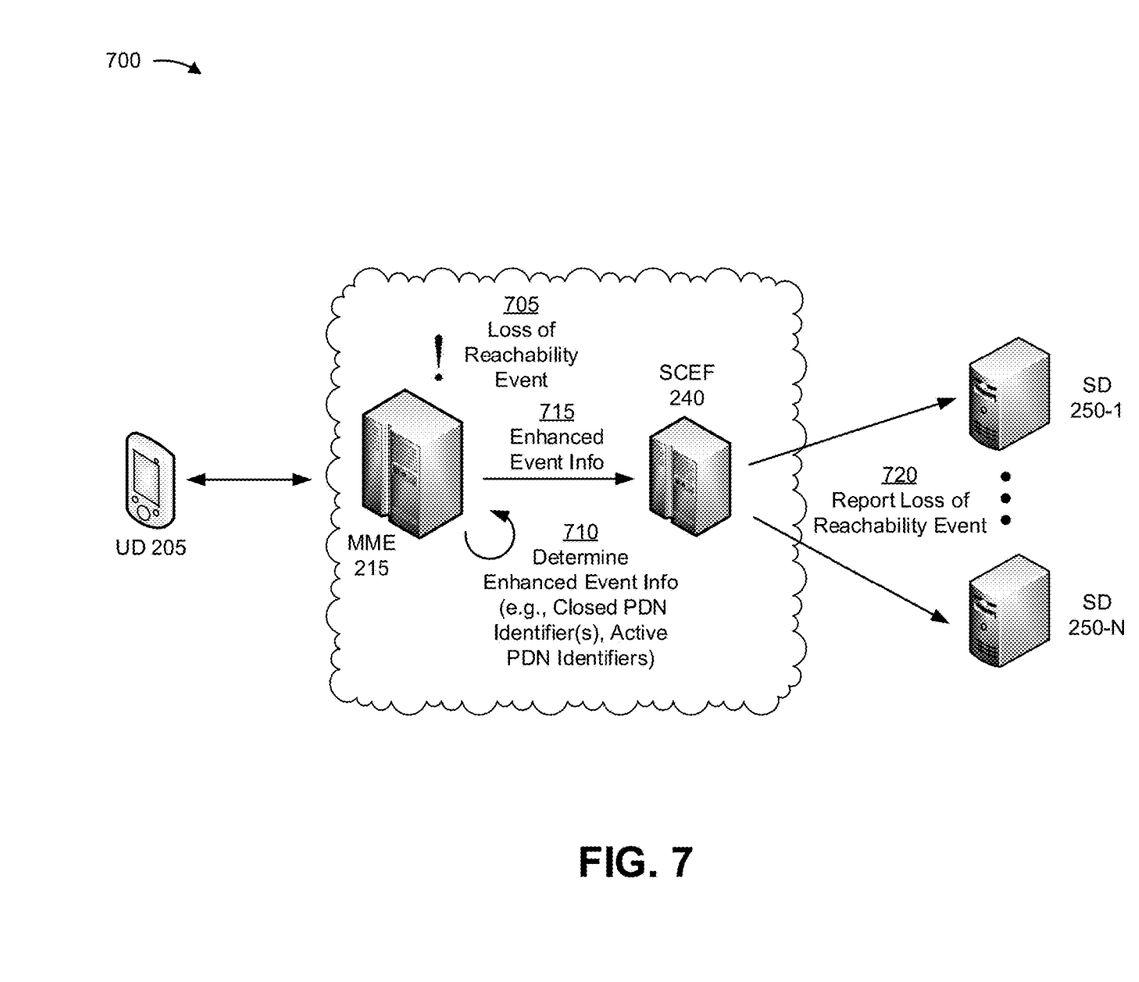
FIG. 7 is a diagram of an additional example implementation relating to the example process shown in FIG. 4.

FIG. 7 is a diagram of an additional example implementation 700 relating to example process 400 shown in FIG. 4. FIG. 7 shows an additional example of enhanced network event reporting.

As shown in FIG. 7, and by reference number 705, MME 215 detects a loss of reachability event (e.g., closure of a PDN connection) associated with user device 205. As shown by reference number 710, MME 215 determines enhanced event information associated with the loss of reachability event, such as information that identifies the PDN connection that has been closed, information that identifies one or more other PDN connections that remain open, or the like. As shown by reference number 715, MME 215 provides the enhanced event information, associated with the loss of reachability event, to SCEF 240. As shown by reference number 720, SCEF 240 provides the enhanced event information (e.g., in the form of an updated data reachability report or a loss of reachability report) to one or more server devices 245 subscribed to receive event reports associated with user device 205.

As indicated above, FIG. 7 is provided merely as an example. Other examples are possible and may differ from what was described with regard to FIG. 7.

Implementations described herein provide a device that is capable of performing enhanced event reporting associated with various types of user device events. In some implementations, the enhance reporting capability allows one or more other devices, subscribed to receive event reporting information associated with the user device, to obtain more detailed, accurate and/or updated event reporting information (e.g., as compared to event reporting information provided using a prior event reporting capability), thereby allowing the one or more devices to more efficiently and/or effectively utilize resources (e.g., network resources, processing resources, or the like) when communicating with one or more user devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors to:
        detect an event associated with a user device,
            the event including
                a loss of reachability event;
        determine, based on detecting the event, event information associated with the event,
            the event information including information indicating that one or more packet data network (PDN) connections are closed and that one or more other PDN connections remain open, while the one or more PDN connections are closed, when the event includes the loss of reachability event; and
        provide the event information for reporting to one or more devices that are to receive event reports associated with the user device,
            the event information causing, when the event information includes the information indicating that the one or more PDN connections are closed and that the one or more other PDN connections remain open, while the one or more PDN connections are closed, the one or more devices to determine whether the user device remains reachable.

2. The device of claim 1,
    where the one or more processors, when detecting the event associated with the user device are to:
        detect a loss of connectivity event; and
    where the one or more processors, when determining the event information, are to:
        determine event information that identifies a reason for detachment from a network when the event includes the loss of connectivity event,
            where the event information that identifies the reason for detachment from the network includes a cause code.

3. The device of claim 1, where the one or more processors, when providing the event information, are to:
    provide the event information to a service capability exposure function device.

4. The device of claim 1, where the one or more processors, when detecting the event associated with the user device, are to:
    detect a loss of connectivity event; and
    the one or more processors, when determining the event information, are to:
        determine event information that identifies a reason for detachment from a network when the event includes the loss of connectivity event.

5. The device of claim 4, where the one or more processors, when providing the event information for reporting detecting the loss of connectivity event, are to:
provide event information preventing the one or more devices from attempting to communicate with the user device.

6. The device of claim 1, where the one or more processors, when detecting the event associated with the user device, are to:
detect a data reachability event;
the one or more processors, when determining the event information, are to:
determine event information that identifies a type of a PDN connection and an access point name (APN) associated with the PDN connection when the event includes the data reachability event; and
the one or more processors, when providing the event information, are to:
cause the one or more devices to communicate with the user device based on the type of the PDN connection.

7. The device of claim 6, where the information that identifies the type of the PDN connection includes information that identifies the PDN connection as an Internet protocol (IP) PDN connection or a non-IP PDN connection, and
where the event information further includes an IP address, associated with the user device, when the information identifies the PDN connection as an IP PDN connection.

8. A non-transitory computer-readable medium storing instructions, the instructions comprising:
one or more instructions that, when executed by one or more processors, cause the one or more processors to:
detect an event associated with a user device,
the event including a loss of reachability event;
determine, based on detecting the event, event information associated with the event,
the event information including information indicating that one or more packet data network (PDN) connections are closed and that one or more other PDN connections remain open, while the one or more PDN connections are closed, when the event includes the loss of reachability event; and
provide the event information for reporting to one or more devices that are to receive event reports associated with the user device,
the event information causing, when the event information includes the information indicating that the one or more PDN connections are closed and that the one or more other PDN connections remain open, while the one or more PDN connections are closed, the one or more devices to determine whether the user device remains reachable.

9. The non-transitory computer-readable medium of claim 8,
where the one or more instructions, that cause the one or more processors to detect the event associated with the user device, cause the one or more processors to:
detect a loss of connectivity event; and
where the one or more instructions, that cause the one or more processors to determine the event information, cause the one or more processors to:
determine event information that identifies a reason for detachment from a network when the event includes the loss of connectivity event,
where the event information that identifies the reason for detachment from the network includes a cause code.

10. The non-transitory computer-readable medium of claim 8, where the one or more instructions, that cause the one or more processors to provide the event information, cause the one or more processors to:
provide the event information to a service capability exposure function device.

11. The non-transitory computer-readable medium of claim 8,
where the one or more instructions, that cause the one or more processors to detect the event associated with the user device, cause the one or more processors to:
detect a loss of connectivity event; and
where the one or more instructions, that cause the one or more processors to determine the event information, cause the one or more processors to:
determine event information that identifies a reason for detachment from a network when the event includes the loss of connectivity event.

12. The non-transitory computer-readable medium of claim 11, where the event information that identifies the reason for detachment includes at least one of:
a tracking area update (TAU) failure,
an expiration of an idle time,
an expected detachment,
a requested detachment, or
a scheduled detachment.

13. The non-transitory computer-readable medium of claim 8,
where the one or more instructions, that cause the one or more processors to detect the event associated with the user device, cause the one or more processors to:
detect a data reachability event;
where the one or more instructions, that cause the one or more processors to determine the event information, cause the one or more processors to:
determine event information that identifies a type of a PDN connection and an access point name (APN) associated with the PDN connection when the event includes the data reachability event; and
where the one or more instructions, that cause the one or more processors to provide the event information, cause the one or more processors to:
cause the one or more devices to communicate with the user device based on the type of the PDN connection.

14. The non-transitory computer-readable medium of claim 13, where the information that identifies the type of the PDN connection includes information that identifies the PDN connection as an Internet protocol (IP) PDN connection or a non-IP PDN connection, and
where the event information further includes an IP address, associated with the user device, when the information identifies the PDN connection as an IP PDN connection.

15. A method, comprising:
detecting, by a device, an event associated with a user device,
the event including a loss of reachability event;
determining, by the device and based on detecting the event, event information associated with the event,
the event information including information indicating that one or more packet data network (PDN) connections are closed and that one or more other PDN connections remain open, while the one or more PDN connections are closed, when the event includes the loss of reachability event; and providing, by the device, the event information for reporting to one or more devices that are to receive event reports associated with the user device.

16. The method of claim 15, where detecting the event associated with the user device comprises:

detecting a loss of connectivity event; and where determining the event information comprises:

determining event information that identifies a reason for detachment from a network when the event includes the loss of connectivity event, where the event information that identifies the reason for detachment from the network includes a cause code.

17. The method of claim 15, where detecting the event associated with the user device comprises:

detecting a loss of connectivity event; and where determining the event information comprises:

determining event information that identifies a reason for detachment from a network when the event includes the loss of connectivity event.

18. The method of claim 17, where the event information that identifies the reason for detachment includes at least one of:

a tracking area update (TAU) failure, an expiration of an idle time, an expected detachment, a requested detachment, or a scheduled detachment.

19. The method of claim 15, where detecting the event associated with the user device comprises:

detecting a data reachability event; and where determining the event information comprises:

determining event information that identifies a type of a PDN connection and an access point name (APN) associated with the PDN connection when the event includes the data reachability event.

20. The method of claim 19, where the information that identifies the type of the PDN connection includes information that identifies the PDN connection as an Internet protocol (IP) PDN connection or a non-IP PDN connection, and where the event information further includes an IP address, associated with the user device, when the information identifies the PDN connection as an IP PDN connection.

* * * * *